(12) United States Patent
Handa et al.

(10) Patent No.: US 9,647,535 B2
(45) Date of Patent: May 9, 2017

(54) COMPACT STRUCTURE OF POWER-SUPPLY APPARATUS CAPABLE OF MINIMIZING ELECTROMAGNETIC NOISE

(71) Applicant: DENSO CORPORATION, Kariya, Aichi-pref. (JP)

(72) Inventors: Yuuichi Handa, Anjo (JP); Katsutoyo Misawa, Kariya (JP); Yuuki Takemoto, Kariya (JP); Shotaro Yamasaki, Kariya (JP); Shuji Kurauchi, Nagoya (JP)

(73) Assignee: DENSO CORPORATION, Kariya (JP)

( * ) Notice: Subject to any disclaimer, the term of this patent is extended or adjusted under 35 U.S.C. 154(b) by 147 days.

(21) Appl. No.: 14/447,118

(22) Filed: Jul. 30, 2014

(65) Prior Publication Data
US 2015/0036388 A1    Feb. 5, 2015

(30) Foreign Application Priority Data

Jul. 30, 2013    (JP) .................................. 2013-157751
Mar. 31, 2014    (JP) .................................. 2014-072806

(51) Int. Cl.
H02M 1/44    (2007.01)
H02M 3/24    (2006.01)
(Continued)

(52) U.S. Cl.
CPC ............... *H02M 1/44* (2013.01); *H01F 27/06* (2013.01); *H02M 3/24* (2013.01); *H02M 3/28* (2013.01)

(58) Field of Classification Search
CPC ...... H02M 3/33576; H02M 3/24; H02M 3/28; H02M 1/44; H02M 7/103; H02M 7/10;
(Continued)

(56) References Cited

U.S. PATENT DOCUMENTS 6,163,457 A * 12/2000 Berth .................. B60L 9/28
361/704
7,203,071 B2 * 4/2007 Nakagawa .......... H01L 23/3107
257/E23.124
(Continued)

FOREIGN PATENT DOCUMENTS

JP    2000-014149    1/2000
JP    2004-343995    12/2004
(Continued)

OTHER PUBLICATIONS

Office Action (2 pgs.) dated Jun. 23, 2015 issued in corresponding Japanese Application No. 2014-072806 with an at least partial English-language translation (2 pgs.).

*Primary Examiner* — Jessica Han
*Assistant Examiner* — Demetries A Gibson
(74) *Attorney, Agent, or Firm* — Nixon & Vanderhye P.C.

(57) ABSTRACT

A power-supply apparatus is provided which includes a transformer, a primary semiconductor unit, a secondary semiconductor unit, and a secondary electronic device. Each of the primary semiconductor unit and the secondary semiconductor units has a plurality of semiconductor devices installed therein. The transformer, the primary semiconductor unit, the secondary semiconductor unit, and the secondary electronic device are electrically joined through connecting conductors. The transformer is laid on the primary semiconductor unit to make a first stack. Similarly, the secondary electronic device is laid on the secondary semiconductor unit. This permits the power-supply apparatus to be reduced in overall size thereof and minimizes adverse effects of electromagnetic noise to ensure the high efficiency in power supply operation.

5 Claims, 19 Drawing Sheets

(51) Int. Cl.
*H02M 3/28* (2006.01)
*H01F 27/06* (2006.01)

(58) Field of Classification Search
CPC .............. H02M 3/33569; H02M 3/337; H05K 7/1432; H01F 27/06; H01F 27/2847; H01F 27/303; H01F 27/306; H01L 2924/14; H01L 2224/48247; H01L 2224/73215; H01L 23/48; H01L 23/4952; H01L 23/49575; H01L 23/5227; H01L 23/645; H01L 24/48; H01L 25/0657; H01L 28/10; H01L 2924/00; H01L 2924/01322; H01L 2924/19042

USPC ............................... 363/52, 47, 14, 125, 132
See application file for complete search history.

(56) References Cited

U.S. PATENT DOCUMENTS

| | | | | |
|---|---|---|---|---|
| 8,488,316 | B2* | 7/2013 | Zeng | H02M 7/003 |
| | | | | 257/666 |
| 8,614,616 | B2* | 12/2013 | Willkofer | H01L 23/48 |
| | | | | 29/602.1 |
| 2005/0047103 | A1 | 3/2005 | Bothe et al. | |
| 2005/0270806 | A1* | 12/2005 | Zhu | H02M 3/33576 |
| | | | | 363/17 |
| 2013/0301312 | A1* | 11/2013 | Konishi | H02M 3/337 |
| | | | | 363/21.15 |

FOREIGN PATENT DOCUMENTS

| | | |
|---|---|---|
| JP | 2008-099378 | 4/2008 |
| JP | 2009-254118 | 10/2009 |
| JP | 2012-213309 | 11/2012 |

* cited by examiner

COMPACT STRUCTURE OF POWER-SUPPLY APPARATUS CAPABLE OF MINIMIZING ELECTROMAGNETIC NOISE

CROSS REFERENCE TO RELATED DOCUMENT

The present application claims the benefit of priority of Japanese Patent Application No. 2013-157751 filed on Jul. 30, 2013 and Japanese Patent Application No. 2014-72806 filed on Mar. 31, 2014, disclosures of which are incorporated herein by reference.

BACKGROUND OF THE INVENTION

1. Technical Field

This disclosure relates generally to a power-supply apparatus which is compact in structure and capable of minimizing adverse effects of electromagnetic noise.

2. Background Art

Hybrid vehicles or electric vehicles usually employ a power-supply apparatus such as a DC-DC converter or a battery charger equipped with a DC-DC converter. Japanese Patent First Publication No. 2000-14149 discloses such a type of power-supply apparatus which is equipped with electronic parts such as semiconductor devices in which switches are fabricated, a choke, and a transformer. The electronic parts are fabricated on a mounting surface of a wiring board disposed on a base plate.

The above power-supply apparatus, however, faces the following drawbacks.

The large number of electronic parts are, as described above, arranged on the wiring board, thus requiring a need for securing an area on the base plate which is large enough to install the electronic parts. This results in an increased overall size of the power-supply apparatus.

The electronic parts are placed on the same level or horizontally, thus needing to secure an interval between adjacent ones of the electronic parts, which leads to an increase in overall length of wire connecting the electronic parts together. Such an increase will result in an increase in electric resistance of the wire, thus causing a loss of electric energy. This lowers the efficiency in operation of the power-supply apparatus. The increase in overall length of the wire will also result in an increase in loop area of the wire, thereby increasing the possibility of electromagnetic noise.

A part of the electromagnetic noise emitted from the wiring board on which the electronic parts are mounted toward the base plate is blocked by the base plate, while the other part of the electromagnetic noise radiating away from the wiring board may affect operations of peripheral devices.

SUMMARY

It is therefore an object to provide an improved structure of a power-supply apparatus which is capable of being reduced in size and designed to reduce electromagnetic noise to enhance the efficiency in operation thereof.

According to one aspect of this disclosure, there is provided a power-supply apparatus which comprises: (a) a transformer equipped with a primary coil and a secondary coil; (b) a primary semiconductor unit in which semiconductor devices are installed, the primary semiconductor unit being joined to the primary coil of the transformer; (c) a secondary semiconductor unit in which semiconductor devices are installed, the secondary semiconductor unit being joined to the secondary coil of the transformer; (d) a secondary electronic device which makes up a secondary circuit along with the secondary semiconductor unit; (e) a plurality of connecting conductors which electrically connect among the transformer, the primary semiconductor unit, the secondary semiconductor unit, and the secondary electronic device; (f) a first stack made up of one of the transformer and the secondary electronic device and the primary semiconductor unit; and (g) a second stack made up of the other of the transformer and the secondary electronic device and the secondary semiconductor unit.

Specifically, one of the transformer and the secondary electronic device is laid on the primary semiconductor unit to make the first stack. Similarly, the other of the transformer and the secondary electronic device is laid on the secondary semiconductor unit to make the second stack. This permits the power-supply apparatus to be reduced in overall size thereof and minimizes adverse effects of electromagnetic noise to ensure the high efficiency in power supply operation.

In other words, each of the first stack and the second stack is made up of two parts laid to overlap each other, thereby decreasing an area to which the parts of the power-supply apparatus are projected, as viewed in a direction in which the two parts are laid on each other, which allows the power-supply apparatus to be reduced in size thereof.

The primary semiconductor unit or the secondary semiconductor unit are staked on the transformer or the secondary electronic device, so that the transformer or the secondary electronic device works as electromagnetic shield to block electromagnetic noise, as emitted from the primary semiconductor unit or the secondary semiconductor unit.

The parts of each of the first stack and the second stack are, as described above, laid on each other, thus resulting in a minimized distance between the parts. This permits the connecting conductors to be decreased in overall length thereof, which reduces the loss of electric energy therefrom and also decreases the volume of space consumed by the connecting conductors in the power-supply apparatus. The decrease in overall length of the connecting conductors will result in a decrease in loop area of the connecting conductors, which reduces the electromagnetic noise arising from the connecting conductors.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
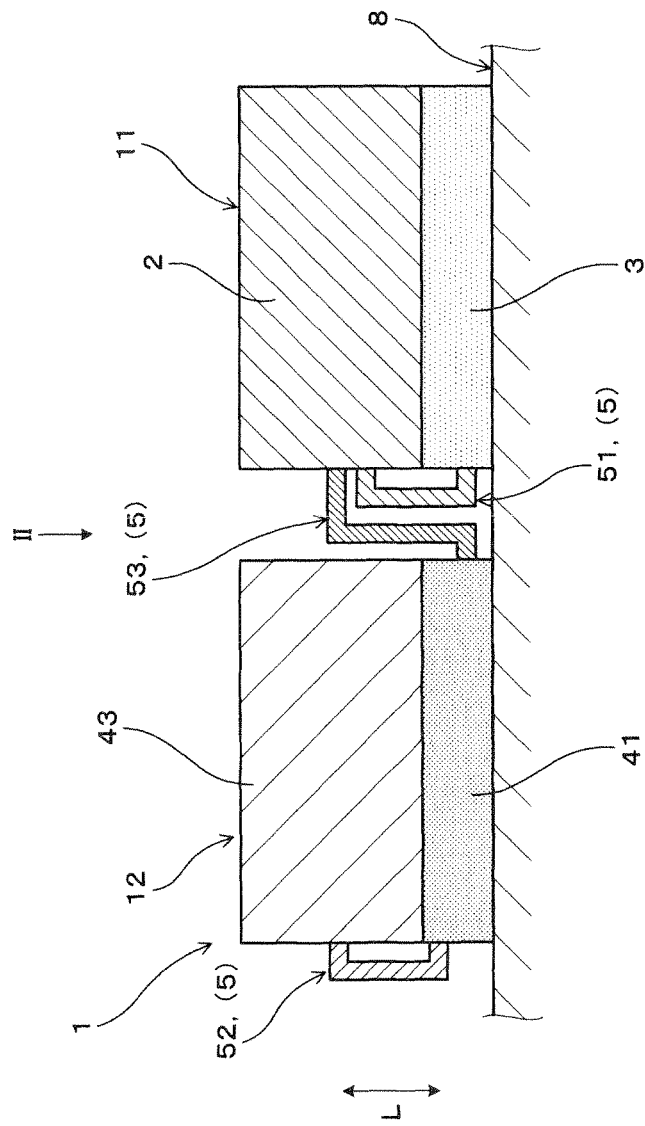
FIG. 1 is a sectional view which illustrates a power-supply apparatus according to the first embodiment.
Figure 2:
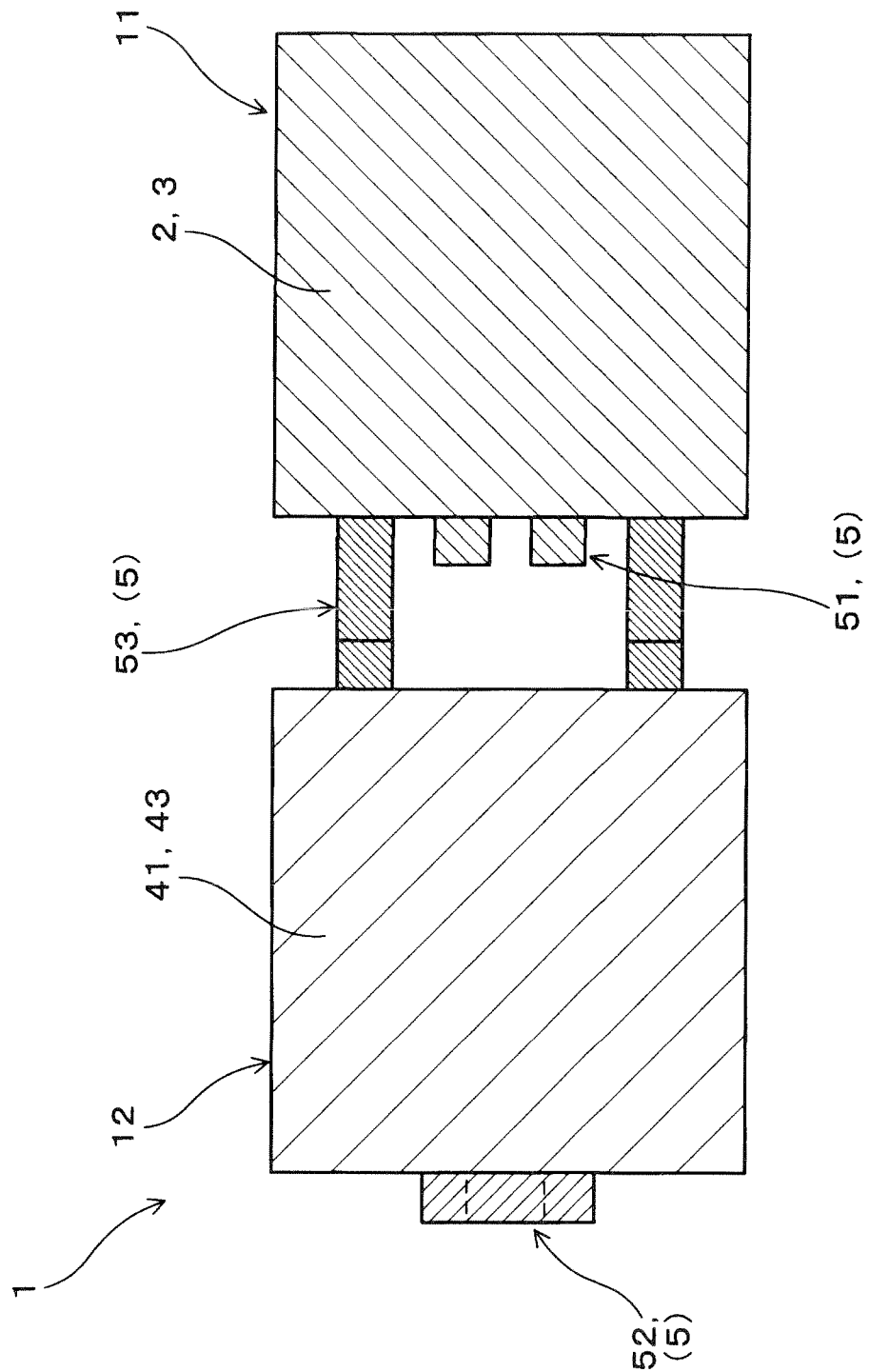
FIG. 2 is a plane view of the power-supply apparatus, as viewed from an arrow II in FIG. 1.
Figure 3:
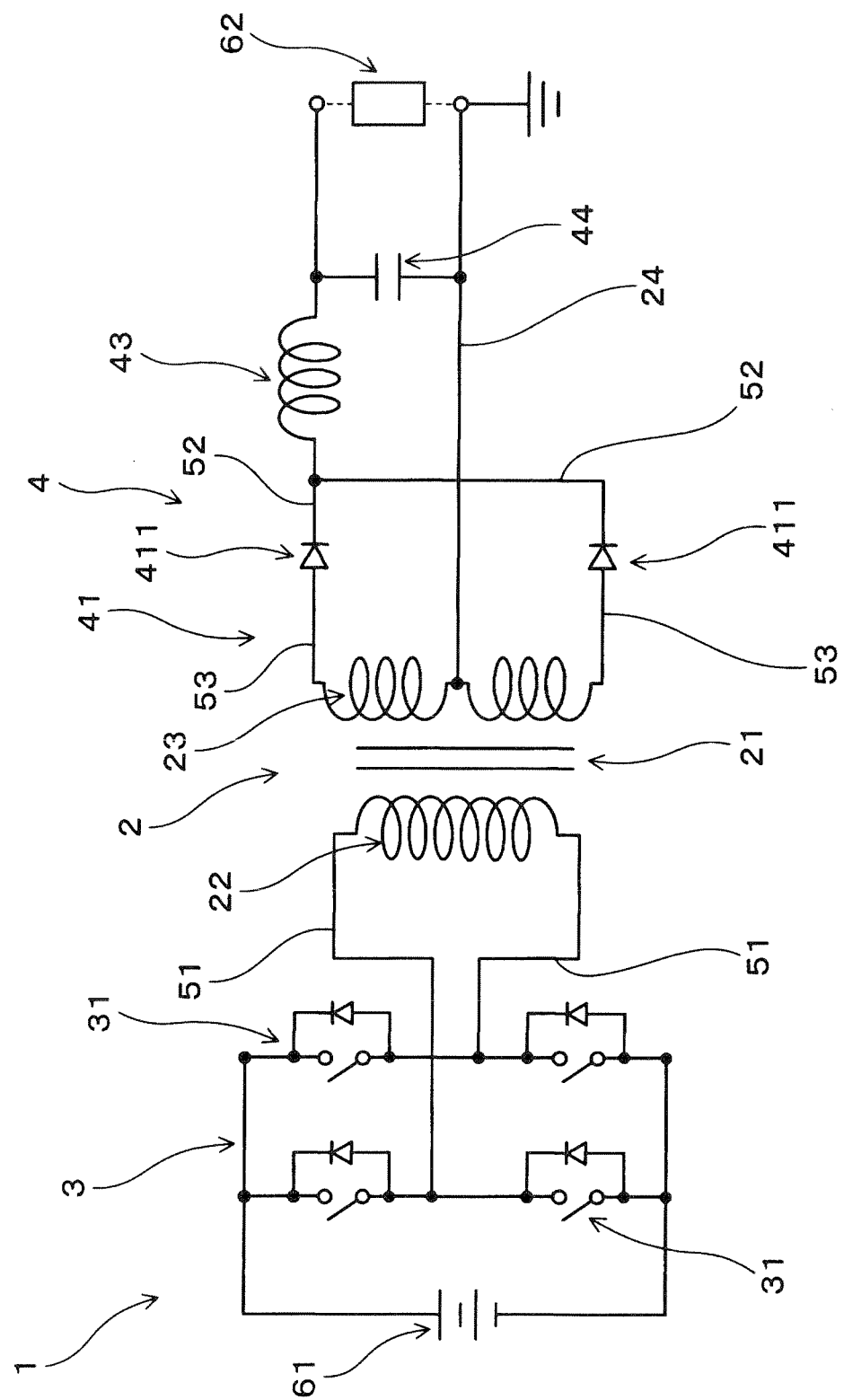
FIG. 3 is a circuit diagram which illustrates a circuit structure of the power-supply apparatus of FIG. 1.

Referring to the drawings, wherein like reference numbers refer to like parts in several views, particularly to FIGS. 1 to 3, there is shown a power-supply apparatus 1 according to the first embodiment. The power-supply apparatus 1 includes a transformer 2, a primary semiconductor module 3, a secondary semiconductor module 41, and a choke coil 43. The transformer 2 is equipped with a primary coil 22 and two secondary coils 23. The primary semiconductor module 3 and the secondary semiconductor module 41 work as a primary semiconductor unit and a secondary semiconductor unit, respectively. The choke coil 43 also works as a secondary semiconductor device which makes up a secondary circuit 4 along with the secondary semiconductor module 41.

The primary semiconductor module 3 connects with the primary coil 22 of the transformer 2. The secondary semiconductor module 41 connects with the secondary coils 23 of the transformer 2. Each of the primary semiconductor module 3 and the secondary semiconductor module 41 has semiconductor devices installed therein.

The transformer 2, the primary semiconductor module 3, the secondary semiconductor module 41, and the choke coil 43 are electrically joined together through connectors 5. The connecting conductors 5 include three types of conductive members: primary connecting conductors 51, a secondary connecting conductor 52, and intermediate connecting conductors 53.

The transformer 2 is disposed on the primary semiconductor module 3 to make a first stack 11. Similarly, the choke coil 43 is disposed on the secondary semiconductor module 41 to make a second stack 12.

Specifically, the power-supply apparatus 1 is, as illustrated in FIG. 3, equipped with the transformer 2 made up of the primary coil 22 and the secondary coils 23, the primary semiconductor module 3 with a plurality of built-in switching devices 31, the secondary semiconductor module 41 with built-in rectifying devices 411, the choke coil 43, and a smoothing capacitor 44.

The transformer 2 is equipped with the primary coil 22 to which an ac voltage is applied, a transformer core 21 through which a magnetic flux, as produced by electric current flowing through the primary coil 22, passes, and the two secondary coils 23 which produce an electromotive force in response to a change in magnetic flux in the transformer core 21.

The primary semiconductor module 3 has four switching devices 31 installed therein to make a full-bridge circuit. Each of the switching devices 31 is connected at a gate thereof to a control circuit (not shown). The control circuit works to control on-off operations of the switching devices 31 to convert a dc voltage into an ac voltage.

The secondary semiconductor module 41, as can be seen in FIG. 3, has the two rectifying devices 411, to make a rectifier which serves to convert a dc electric power to an ac electric power.

The choke coil 43 and the smoothing capacitor 44 form a smoothing circuit to smooth a pulsating flow (i.e., fluctuations) of the dc electric power.

The power-supply apparatus 1 also includes a high-voltage dc power source 61 which produces a high-voltage dc electric power. The primary semiconductor module 3 works to convert the high-voltage dc electric power, as outputted from the high-voltage dc power source 61, into a high-voltage ac electric power. Subsequently, the transformer 2 steps down the high-voltage ac electric power to a low-voltage ac electric power. The low-voltage ac electric power is then rectified by the secondary semiconductor module 41 into a low-voltage dc electric power. The low-voltage dc electric power is smoothed by the smoothing circuit made up of the choke coil 43 and the smoothing capacitor 44 and then charged in a low-voltage dc power source.

Referring back to FIGS. 1 and 2, the first stack 11 is, as described above, made of a stack of the primary semiconductor module 3 and the transformer 2. Similarly, the second stack 12 is made of a stack of the secondary semiconductor module 41 and the choke coil 43. The direction in which the primary semiconductor module 3 is stacked on the transformer 2 is parallel to that in which the secondary semiconductor module 41 is stacked on the choke coil 43. Such a direction will also be referred to as a stacking direction L below.

The primary semiconductor module 3 and the transformer 2 of the first stack 11 are electrically joined together by the primary connecting conductors 51 which extend between the first stack 11 and the second stack 12.

Each of the primary connecting conductors 51 is made of conductive material and of a substantially U-shape. Each of the primary connecting conductors 51 is joined at one end thereof to one of surfaces of the primary semiconductor module 3 (i.e., an inner side surface) which faces the second stack 12 and at other end thereof to one of surfaces of the transformer 2 (i.e., an inner side surface) which faces the second stack 12. The other end of each of the primary connecting conductors 51, as can be seen in FIG. 3, electrically leads to the primary coil 22 of the transformer 2.

The secondary semiconductor module 41 and the choke coil 43 of the second stack 12 are electrically joined together by the secondary connecting conductor 52 which extends outside the outer side surface of the second stack 12 which is farther away from the first stack 11.

The secondary connecting conductor 52 is made of conductive material and of a substantially U-shape. The secondary connecting conductor 52 is joined at one end thereof to one of surfaces of the secondary semiconductor module 41 (i.e., an outer side surface) which is farther away from the first stack 11 and at other end thereof to one of surfaces of the choke coil 43 (i.e., an outer side surface) which is farther away from the first stack 11.

The first stack 11 and the second stack 12 are disposed on a metallic base plate 8 and connected together by the intermediate connecting conductor 53.

Specifically, the intermediate connecting conductors 53 connect between the secondary coil 23 of the transformer 2 of the first stack 11 and the secondary semiconductor module 41 of the second stack 12.

The operation of and beneficial effects offered by the structure of the power-supply apparatus 1 will be described below.

The transformer 2 of the power-supply apparatus 1, as described above, makes up the first stack 11 together with the primary semiconductor module 3. Similarly, the choke coil 43 makes up the second stack 12 together with the secondary semiconductor module 41. This results in a decrease in size of the power-supply apparatus 1 and minimizes the adverse effects of electromagnetic noise, as discussed in the introductory part of this application.

Specifically, each of the first stack 11 and the second stack 12 is made up of two parts laid to overlap each other in the thickness-wise direction (i.e., the stacking direction L), thereby minimizing an area to which the parts of the power-supply apparatus 1 are projected in the stacking direction L, that is, an area on the base plate 8 required for laying out the parts of the power-supply apparatus 1. This permits the overall size of the power-supply apparatus 1 to be reduced.

The primary semiconductor module 3 and the transformer 2 are stacked. Similarly, the secondary semiconductor module 41 and the choke coil 43 are stacked. The transformer 2 and the choke coil 43, therefore, work as an electromagnetic shield to block electromagnetic noises, as emitted from the primary semiconductor module 3 and the secondary semiconductor module 41.

The parts of each of the first stack 11 and the second stack 12 are laid on each other, thus resulting in a minimized distance between the parts. This permits the connecting conductors 5 to be decreased in overall length thereof, which reduces the loss of electric energy therefrom and also decreases the volume of space consumed by the connecting conductors 5 in the power-supply apparatus 1. The decrease in overall length of the connecting conductors 5 will result in a decrease in loop area of the connecting conductors 5, which reduces the electromagnetic noise arising from the connecting conductors 5.

The primary connecting conductors 51 and the intermediate connecting conductors 53 are, as described above, disposed between the first stack 11 and the second stack 12, thus permitting the overall length thereof to be minimized, which leads to a decrease in loop area of the primary connecting conductors 51 and the intermediate connecting conductors 53. This allows the overall size of the power-supply apparatus 1 to be reduced and also decreases the loss of electric energy and the electromagnetic noise from the primary connecting conductors 51 and the intermediate connecting conductors 53.

The first stack 11 is, as described above, made up of the primary semiconductor module 3 and the transformer 2 which are laid to overlap each other and electrically joined together through the primary connecting conductors 51. A high-frequency ac current, thus, flows through the primary conductors 51, so that the electromagnetic noise will arise.

The primary connecting conductors 51 are disposed between the first stack 11 and the second stack 12, thereby causing the electromagnetic noise to be blocked by the first stack 11 and the second stack 12 to minimize the adverse effects thereof on the peripheral devices.

The second stack 12 is, as described above, made up of the secondary semiconductor module 41 and the choke coil 43 (i.e., the secondary electronic part) which are laid to overlap each other and electrically joined together through the secondary connecting conductor 52. The dc current flows through the secondary conductor 52. The secondary conductor 52 is, as already described, located on one of side surfaces of the second stack 12 which is farther away from the first stack 11, thus avoiding the adverse effects of the electromagnetic noise emitted from the primary connecting conductors 51 and the intermediate connecting conductors 53 on the dc current flowing through the secondary connecting conductor 52.

As apparent from the above discussion, the structure of the power-supply apparatus 1 is capable of being reduced in size, highly efficient in operation thereof, and minimizes undesirable emission of electromagnetic noise.

Figure 4:
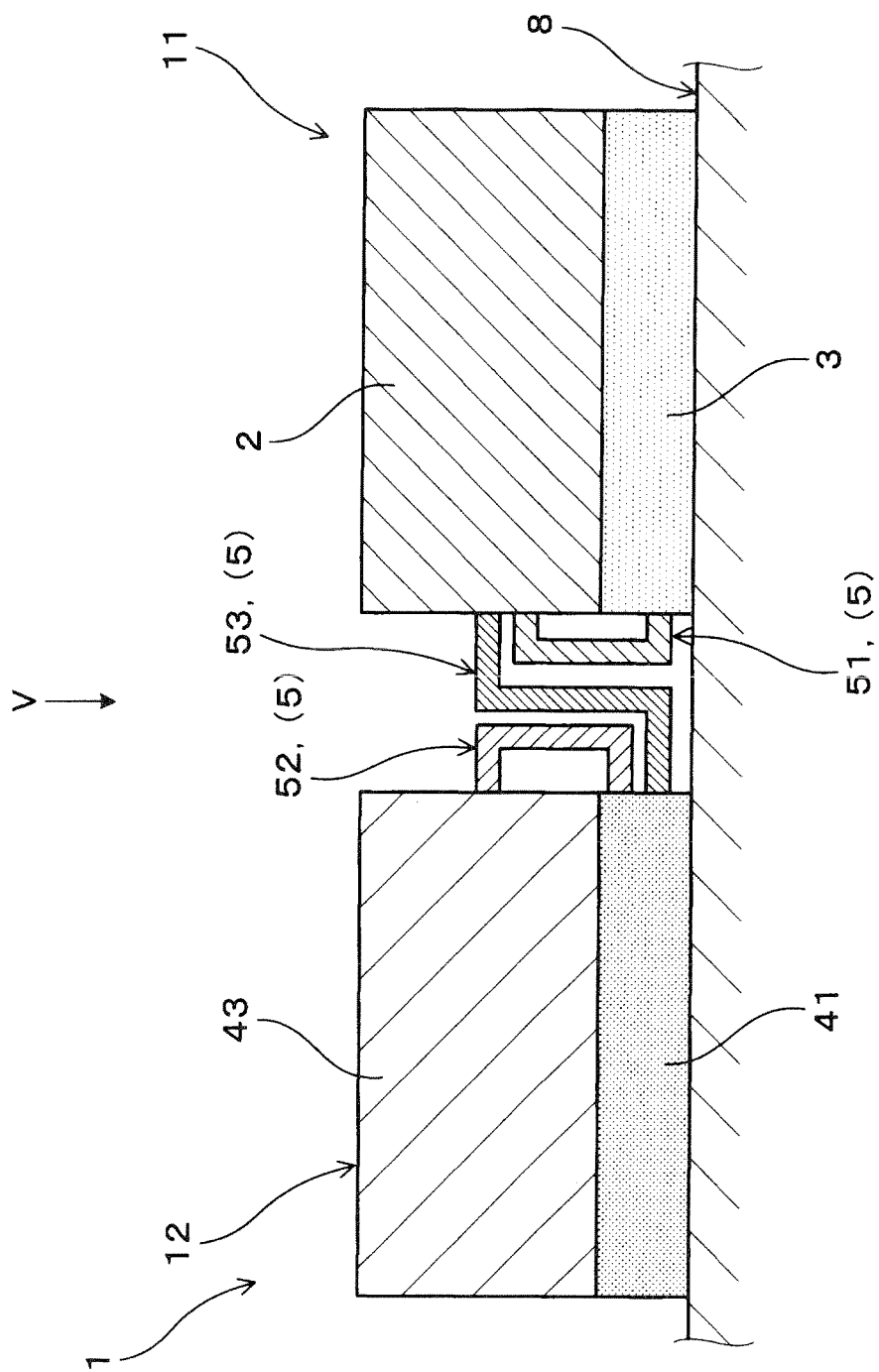
FIG. 4 is a sectional view which illustrates a power-supply apparatus according to the second embodiment.
Figure 5:
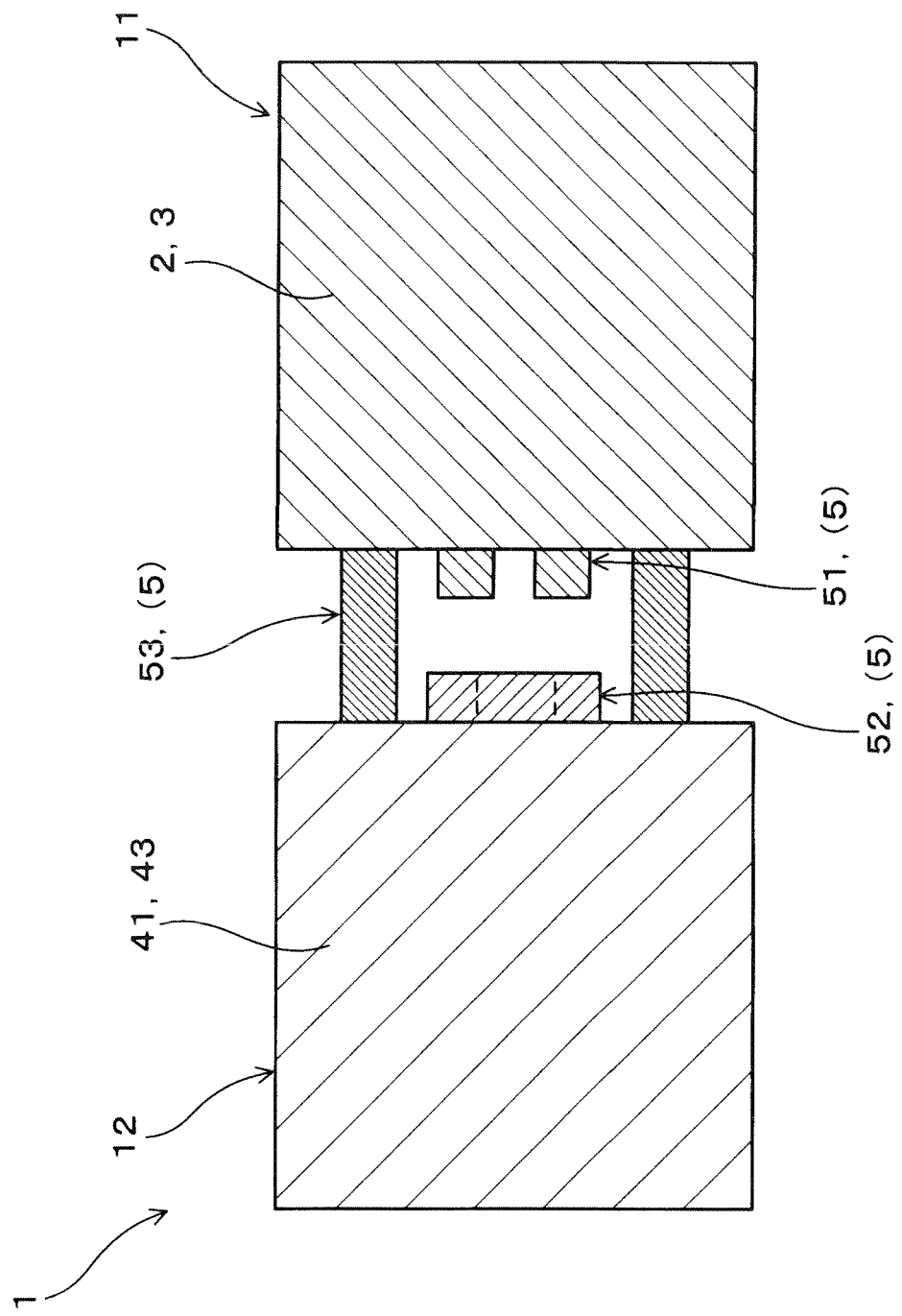
FIG. 5 is a plane view of the power-supply apparatus, as viewed from an arrow V in FIG. 4.

FIGS. 4 and 5 illustrate the power-supply apparatus 1 according to the second embodiment. The same reference numbers as employed in the first embodiment will refer to the same parts, and explanation thereof in detail will be omitted here.

The secondary connecting conductor 52 which establishes the electric joint between the secondary semiconductor module 41 and the choke coil 43 of the second stack 12 is arranged between the side surfaces of the first stack 11 and the second stack 12.

Specifically, the primary connecting conductors 51, the secondary connecting conductor 52, and the intermediate connecting conductors 53 are all disposed between the inner side surfaces of the first stack 11 and the second stack 12, thus permitting the overall length of the connecting conductors 5 (i.e., the primary connecting conductors 51, the secondary connecting conductor 52, and the intermediate connecting conductors 53) to be decreased as compared with the first embodiment. This reduces the loss of electric energy from the connecting conductors 5 to ensure the high efficiency in operation of the power-supply apparatus 1 and also permits the size of the power-supply apparatus 1 to be reduced.

Figure 6:
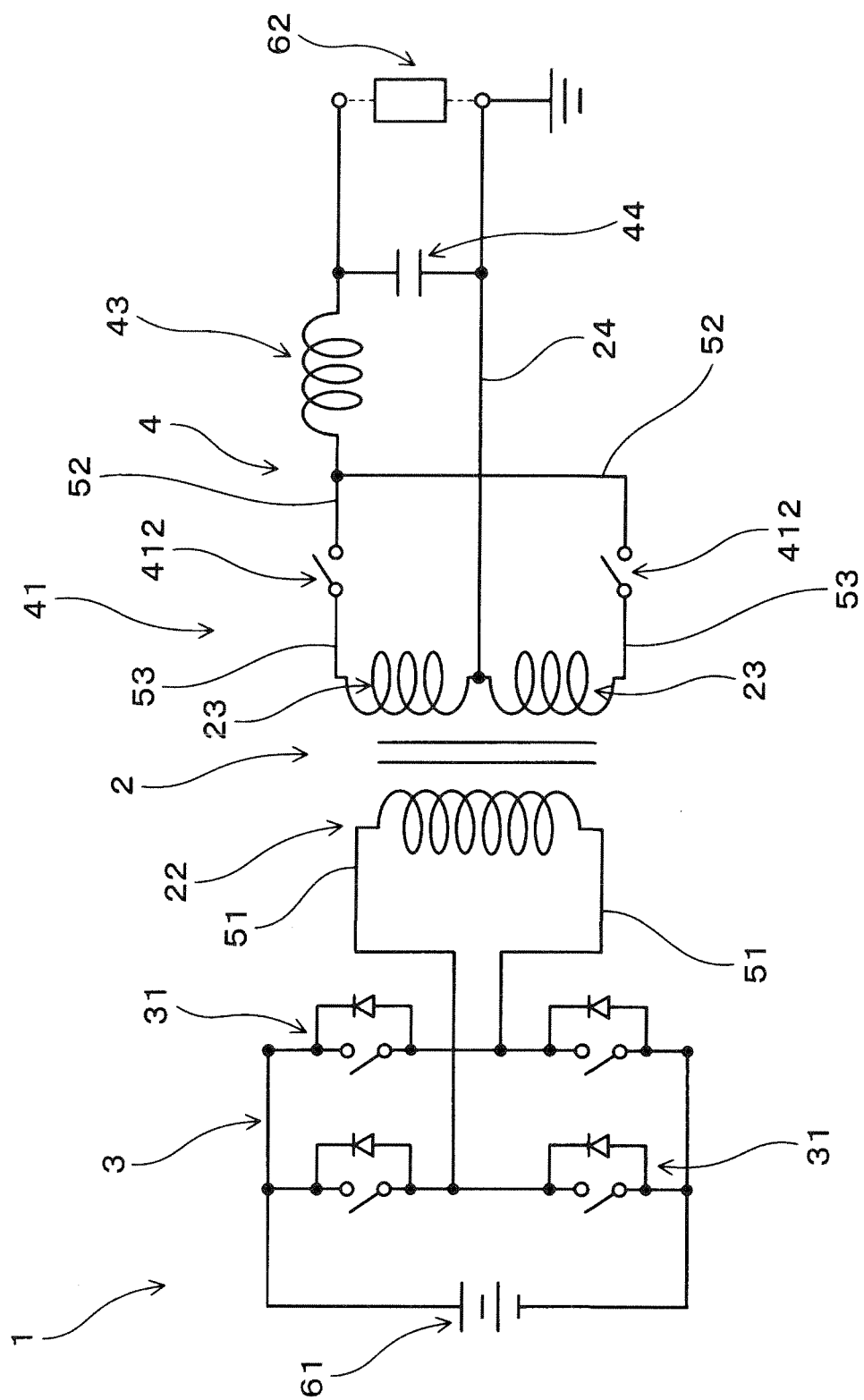
FIG. 6 is a circuit diagram which illustrates a circuit structure of a power-supply apparatus according to the third embodiment.

FIG. 6 illustrates the power-supply apparatus 1 according to the third embodiment. The same reference numbers as employed in the first embodiment will refer to the same parts, and explanation thereof in detail will be omitted here.

The secondary semiconductor module 41 is equipped with two switching devices 412 to make a synchronous rectifier circuit. The power-supply apparatus 1, therefore, selectively works to step-down a high-voltage dc power to a low-voltage dc power and step-up a low-voltage dc power to a high-voltage dc power. Each of the first stack 11, the second stack 12, and the connecting conductors 5 may be designed either to be identical or different in structure with or from that in the first embodiment.

The other arrangements and beneficial effects are identical with those in the first embodiment, and explanation thereof in detail will be omitted here.

Figure 7:
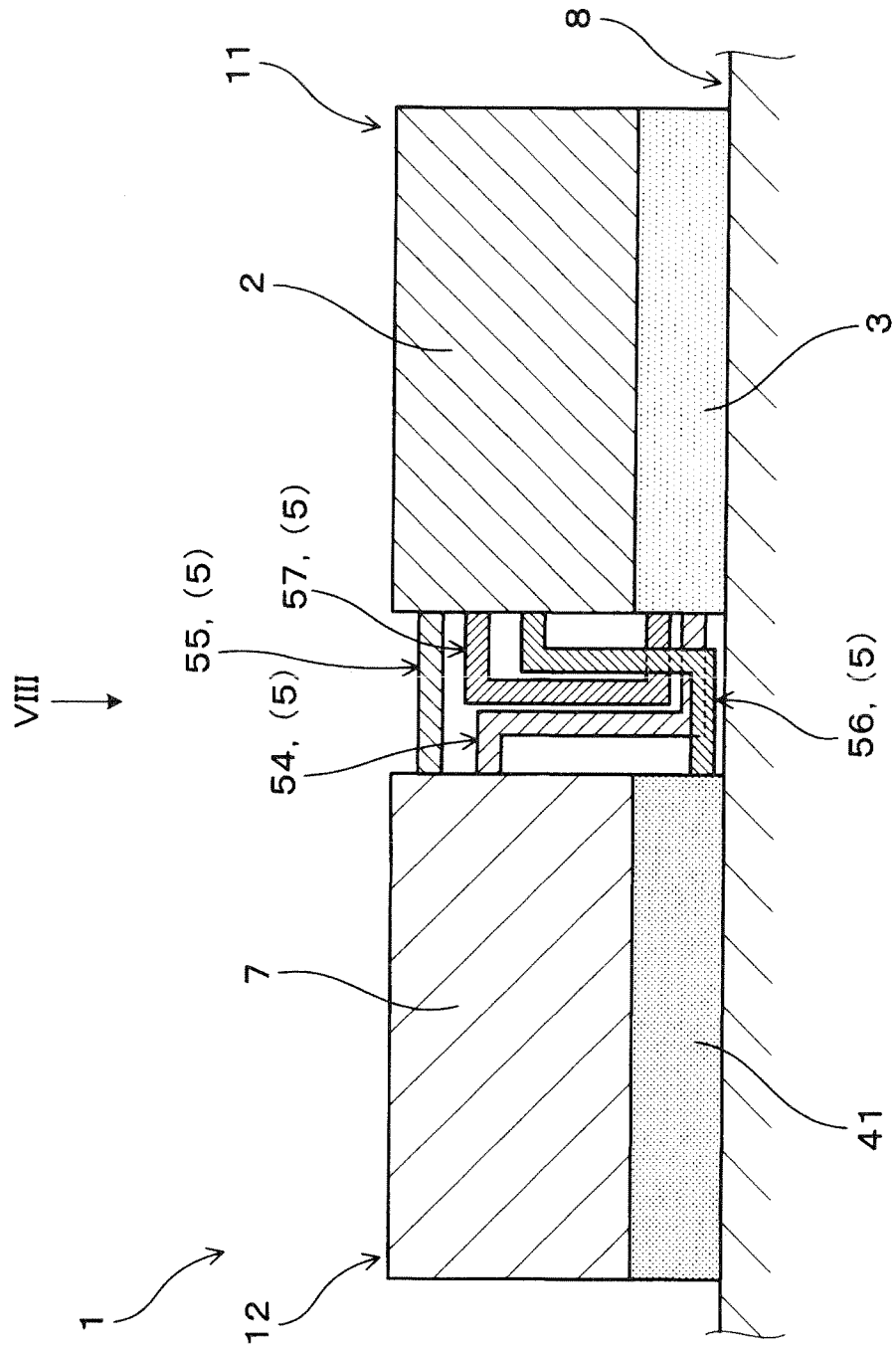
FIG. 7 is a sectional view which illustrates a power-supply apparatus according to the fourth embodiment.
Figure 8:
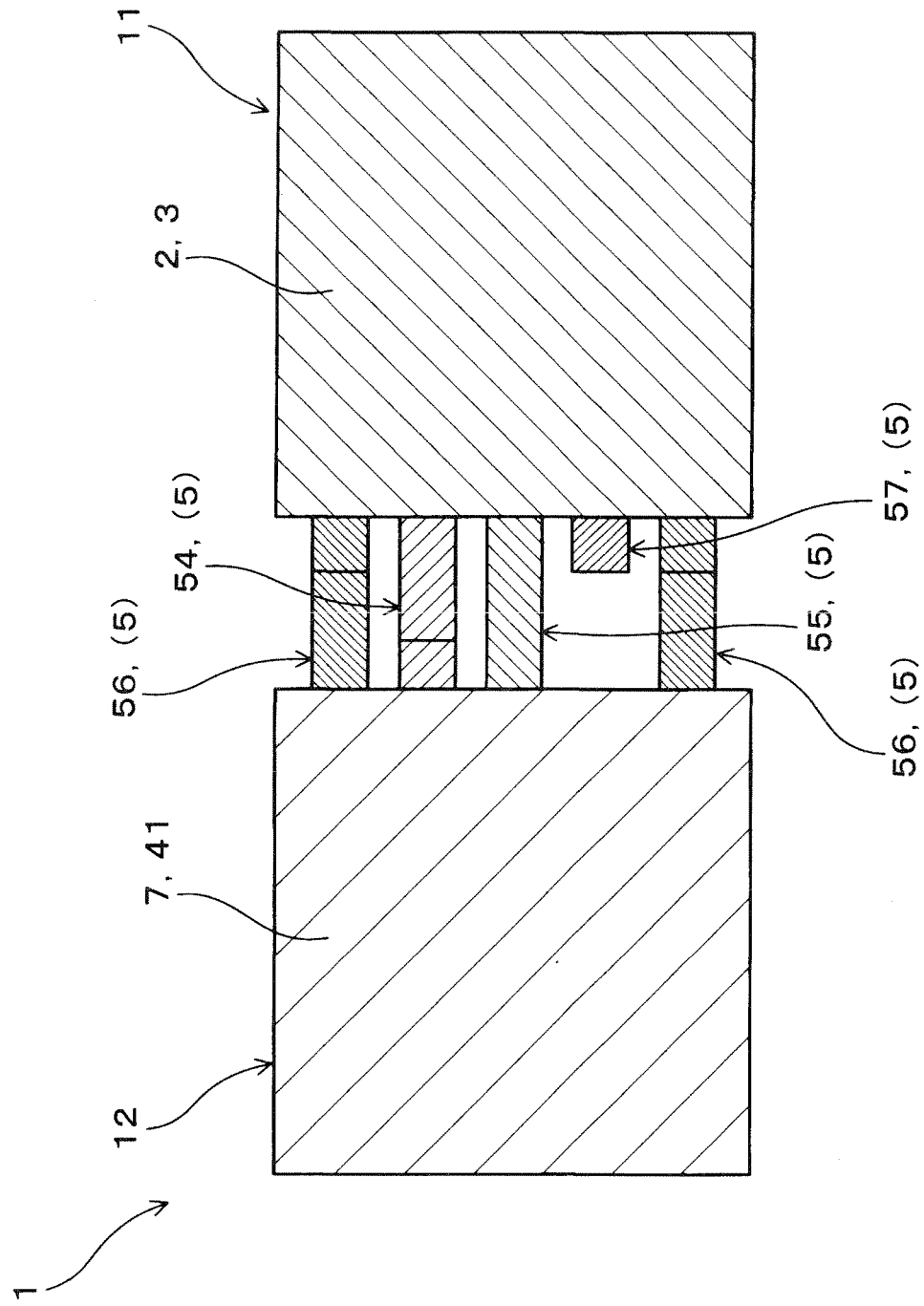
FIG. 8 is a plane view of the power-supply apparatus, as viewed from an arrow VIII FIG. 7.
Figure 9:
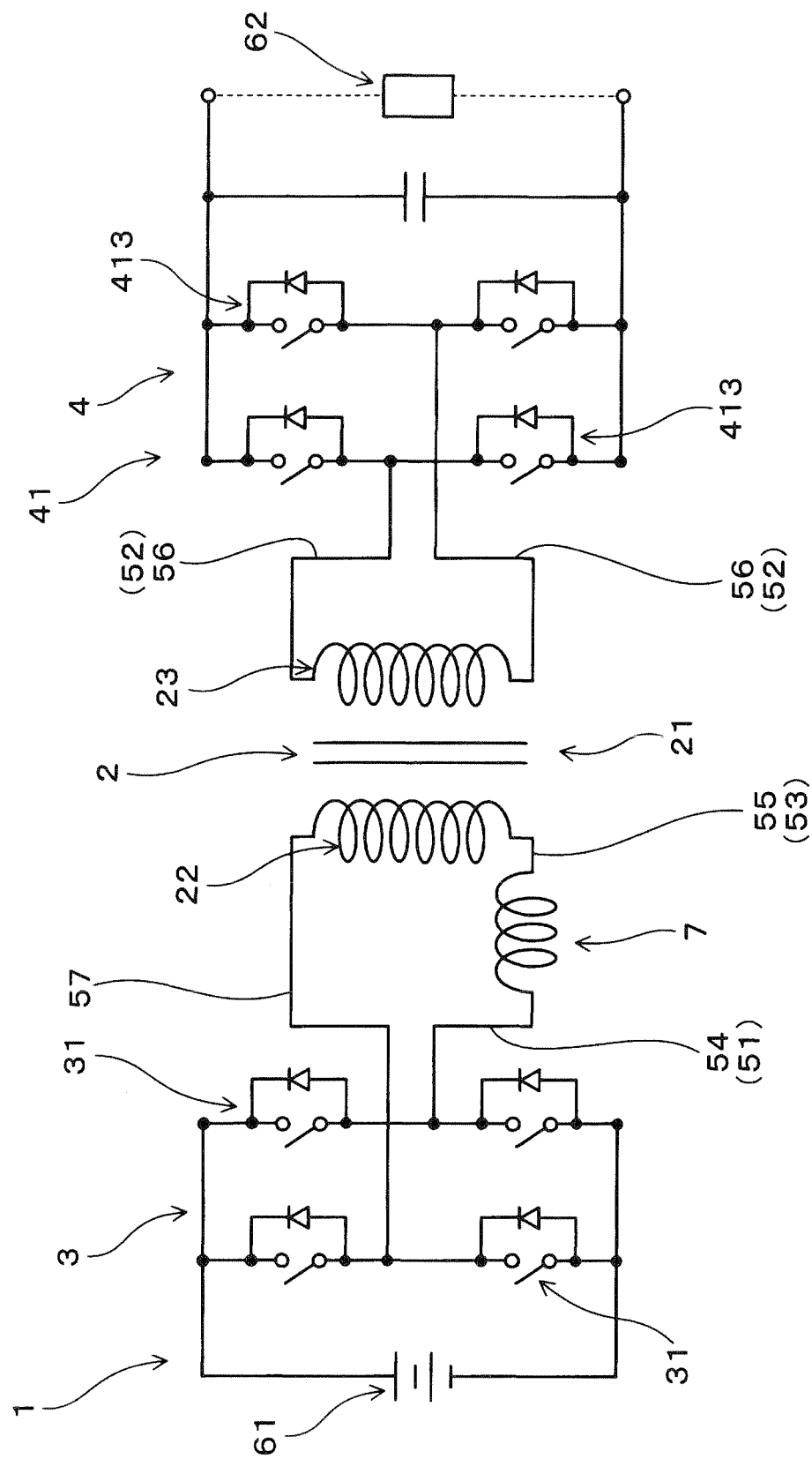
FIG. 9 is a circuit diagram which illustrates a circuit structure of the power-supply apparatus of FIGS. 7 and 8.

FIGS. 7 to 9 illustrate the power-supply apparatus 1 according to the fourth embodiment. The same reference numbers as employed in the first embodiment will refer to the same parts, and explanation thereof in detail will be omitted here.

The power-supply apparatus 1, as can be seen in FIG. 9, has a choke coil 7 disposed between the primary semiconductor module 3 and the transformer 2. The secondary semiconductor module 41 is made up of four switching devices 413 which function as a full-bridge circuit.

The first stack 11 is, as can be seen in FIGS. 7 and 8, formed by the primary semiconductor module 3 and the transformer 2 which are laid to overlap each other in the thickness-wise direction thereof. The second stack 12 is formed by the secondary semiconductor module 41 and the choke coil 7 which are laid to overlap each other in the thickness-wise direction thereof.

The connecting conductors 5 include four types of conductive members: a first connecting conductor 54, a second connecting conductor 55, third connecting conductors 56, and a fourth connecting conductor 57. The first connecting conductor 54 joins the primary semiconductor module 3 and the choke coil 7. The second connecting conductor 55 joins the choke coil 7 and the primary coil 22 of the transformer 2. The third connecting conductors 56 joins the secondary coil 23 of the transformer 2 and the secondary semiconductor module 41. The fourth connecting conductor 57 joins the primary coil 22 of the transformer 2 and the primary semiconductor module 3. The first connecting conductor 54, the second connecting conductor 55, the third connecting conductors 56, and the fourth connecting conductor 57 are, as can be seen in FIG. 7, all arranged between the inner side surfaces of the first stack 11 and the second stack 12.

The other arrangements and beneficial effects are identical with those in the first embodiment, and explanation thereof in detail will be omitted here.

FIGS. 10 to 13 illustrate the power-supply apparatus 1 according to the fifth embodiment. The same reference numbers as employed in the first embodiment will refer to the same parts, and explanation thereof in detail will be omitted here.

Figure 10:
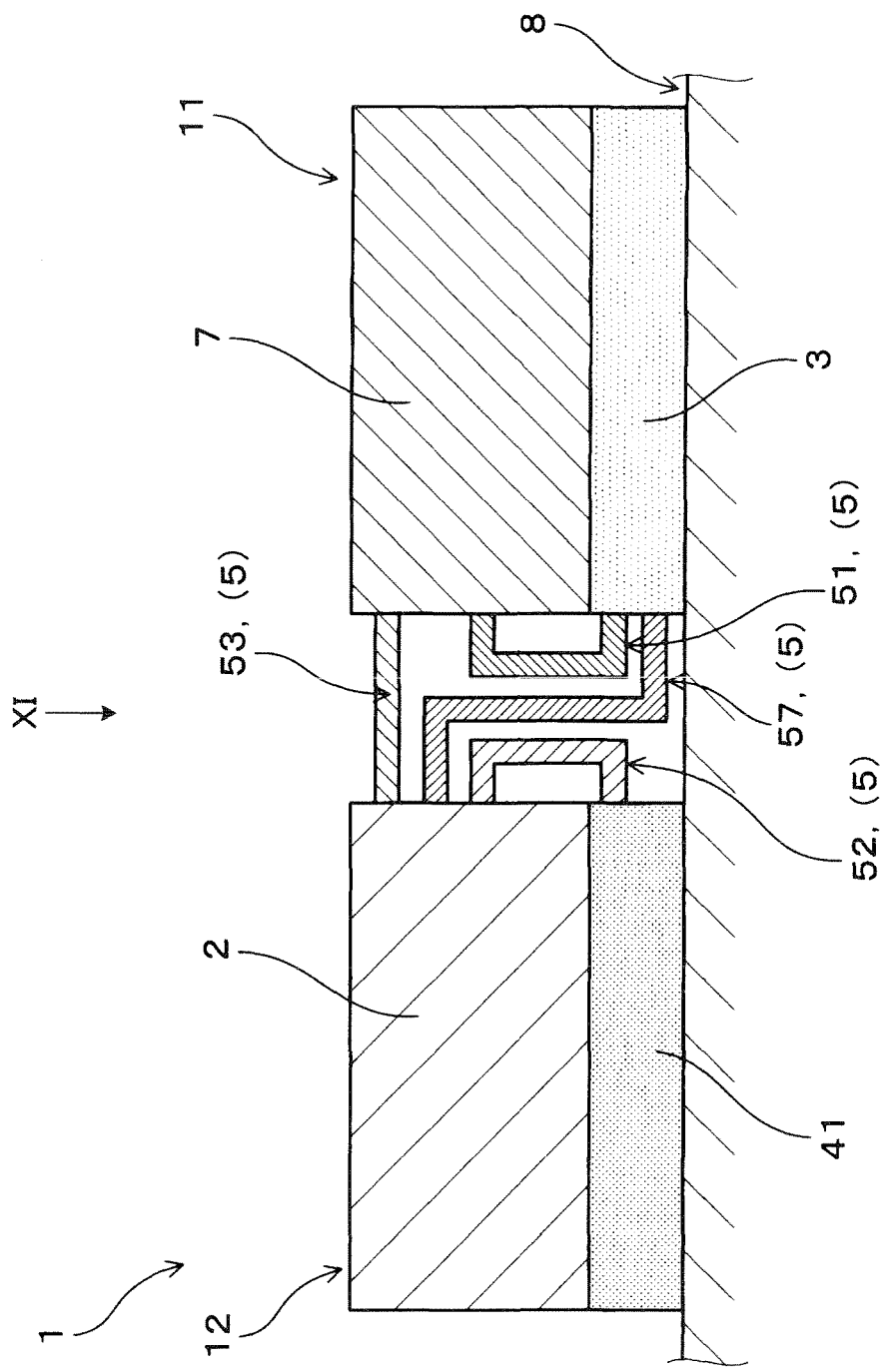
FIG. 10 is a sectional view which illustrates a power-supply apparatus according to the fifth embodiment.
Figure 11:
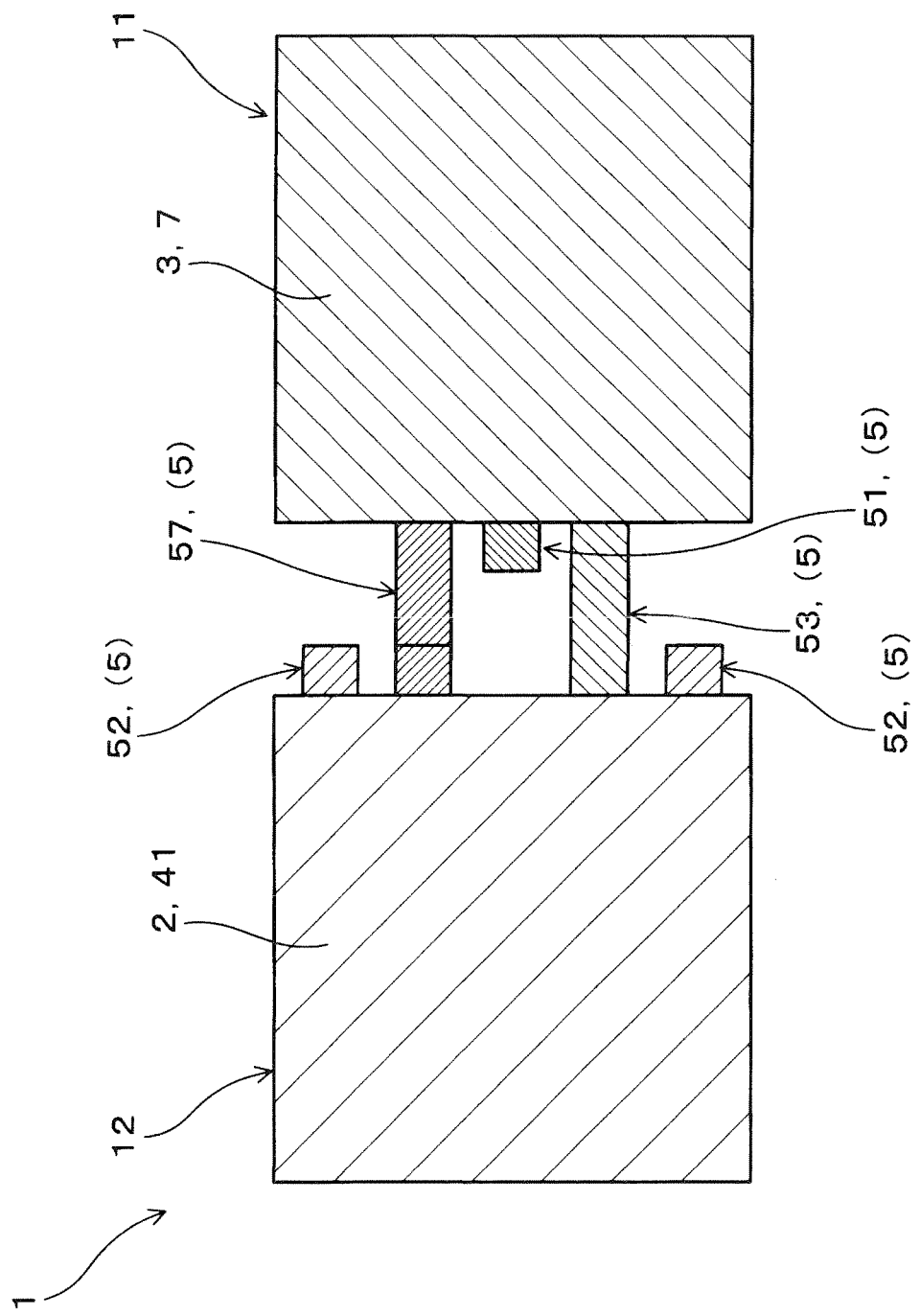
FIG. 11 is a plane view of the power-supply apparatus, as viewed from an arrow XI in FIG. 10.

The first stack 11 is, as can be seen in FIG. 10, formed by the primary semiconductor module 3 and the choke coil 7 which are laid to overlap each other. The second stack 12 is formed by the secondary semiconductor module 41 and the transformer 2 which are laid to overlap each other.

The connecting conductors 5 include four types of conductive members: a primary connecting conductor 51, secondary connecting conductors 52, an intermediate connecting conductor 53, and a fourth connecting conductor 57. The primary connecting conductor 51 joints the primary semiconductor module 3 and the choke coil 7. The intermediate connecting conductor 53 joints the choke coil 7 and the primary coil 22 of the transformer 2. The secondary connecting conductors 52 joint the secondary coil 23 of the transformer 2 and the secondary semiconductor module 41. The fourth connecting conductor 57 joints the primary coil 22 of the transformer 2 and the primary semiconductor module 3. The primary connecting conductor 51, the intermediate connecting conductor 53, the secondary connecting conductor 52, and the fourth connecting conductor 57 are, as can be seen in FIG. 10, all arranged between the inner side surfaces of the first stack 11 and the second stack 12.

Figure 12:
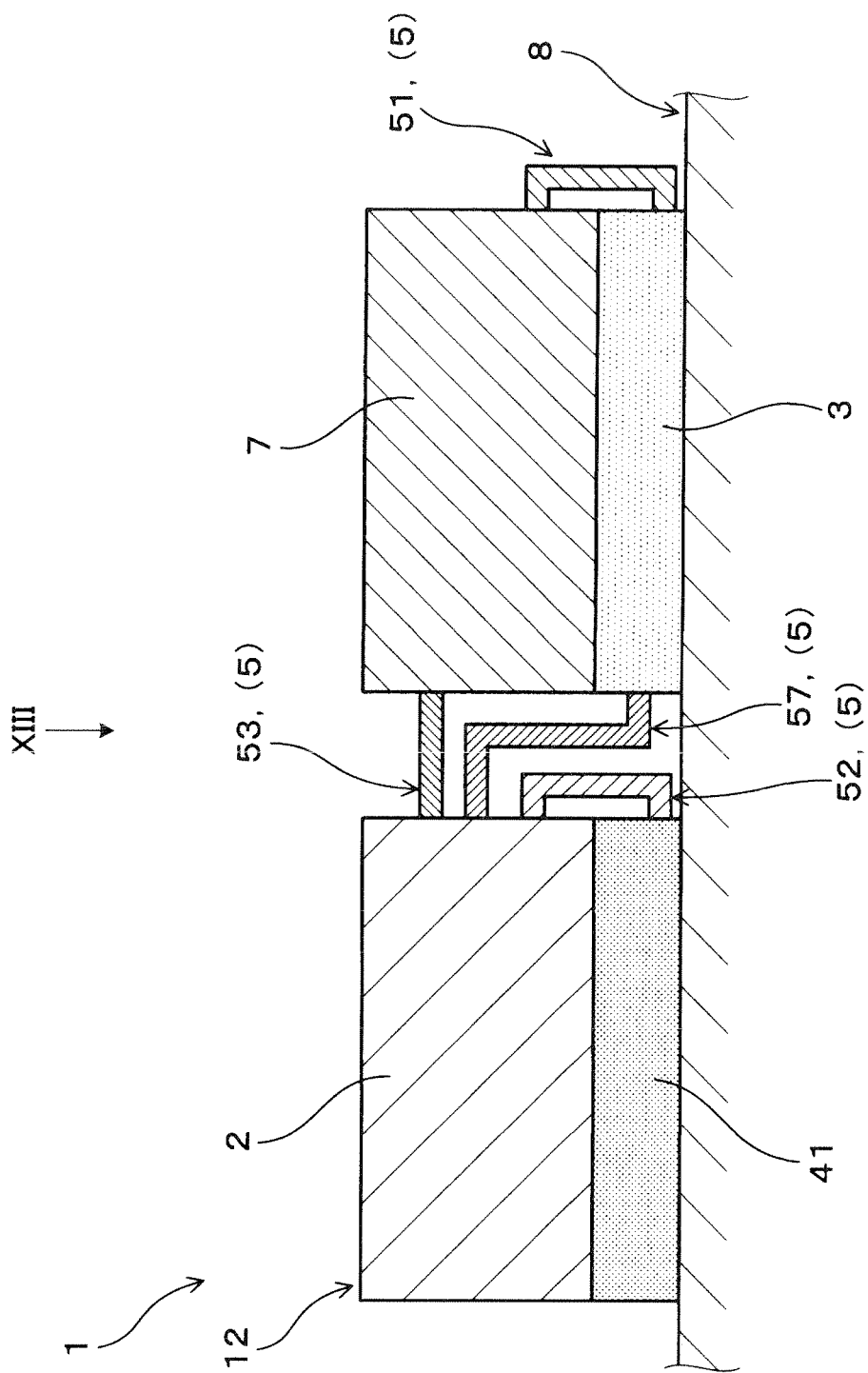
FIG. 12 is a sectional view which illustrates a modification of the power-supply apparatus of FIG. 10.
Figure 13:
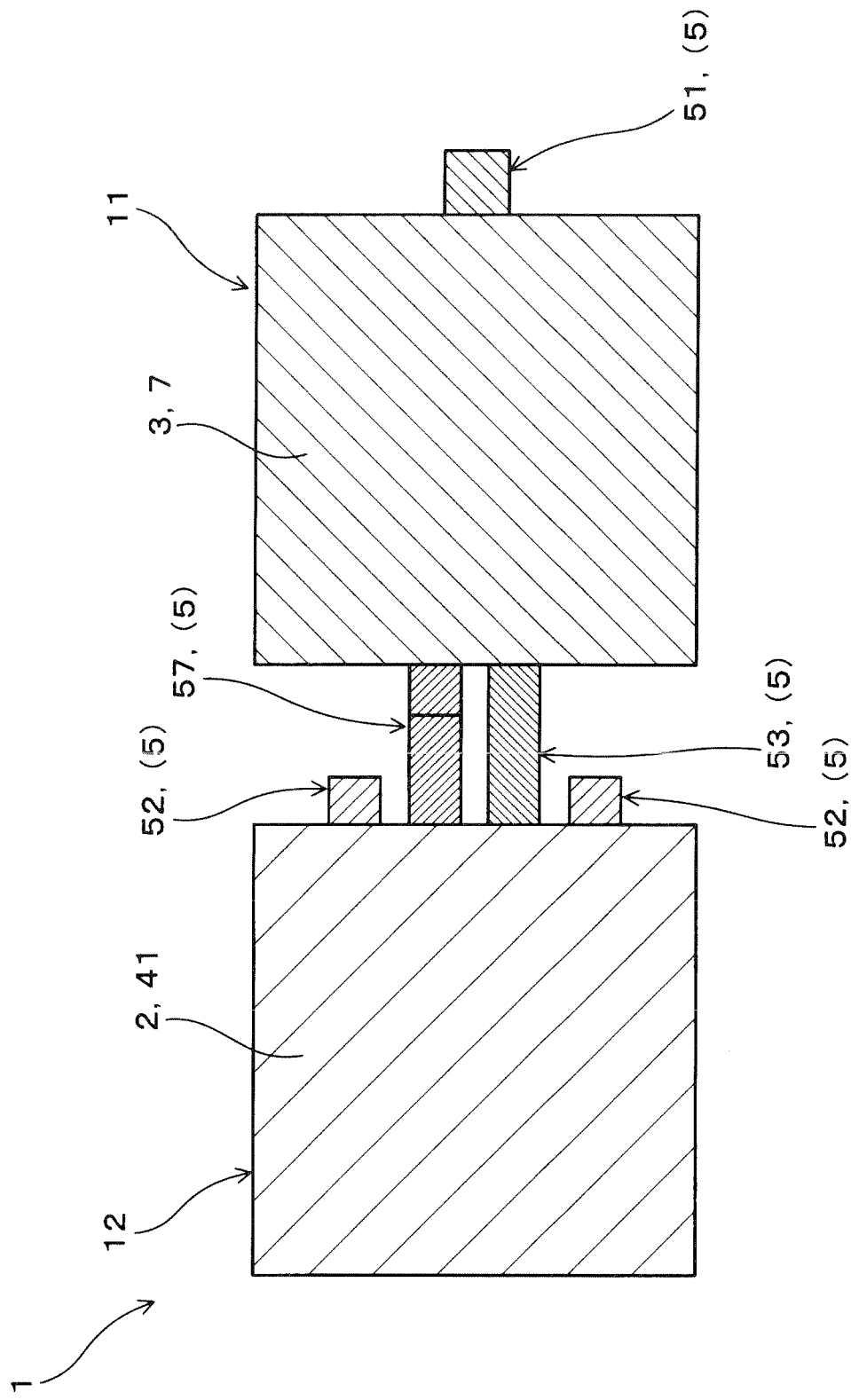
FIG. 13 is a plane view of the power-supply apparatus, as viewed from an arrow XIII in FIG. 12.

The primary connecting conductor 51 may alternatively be, as illustrated in FIGS. 12 and 13, arranged on an outer one of the side surfaces of the first stack 11 which is farther away from the second stack 12.

The power-supply apparatus 1 of this embodiment, as illustrated in FIGS. 10 to 13, has the same circuit structure as that in the fourth embodiment.

The other arrangements and beneficial effects are identical with those in the first embodiment, and explanation thereof in detail will be omitted here.

Figure 14:
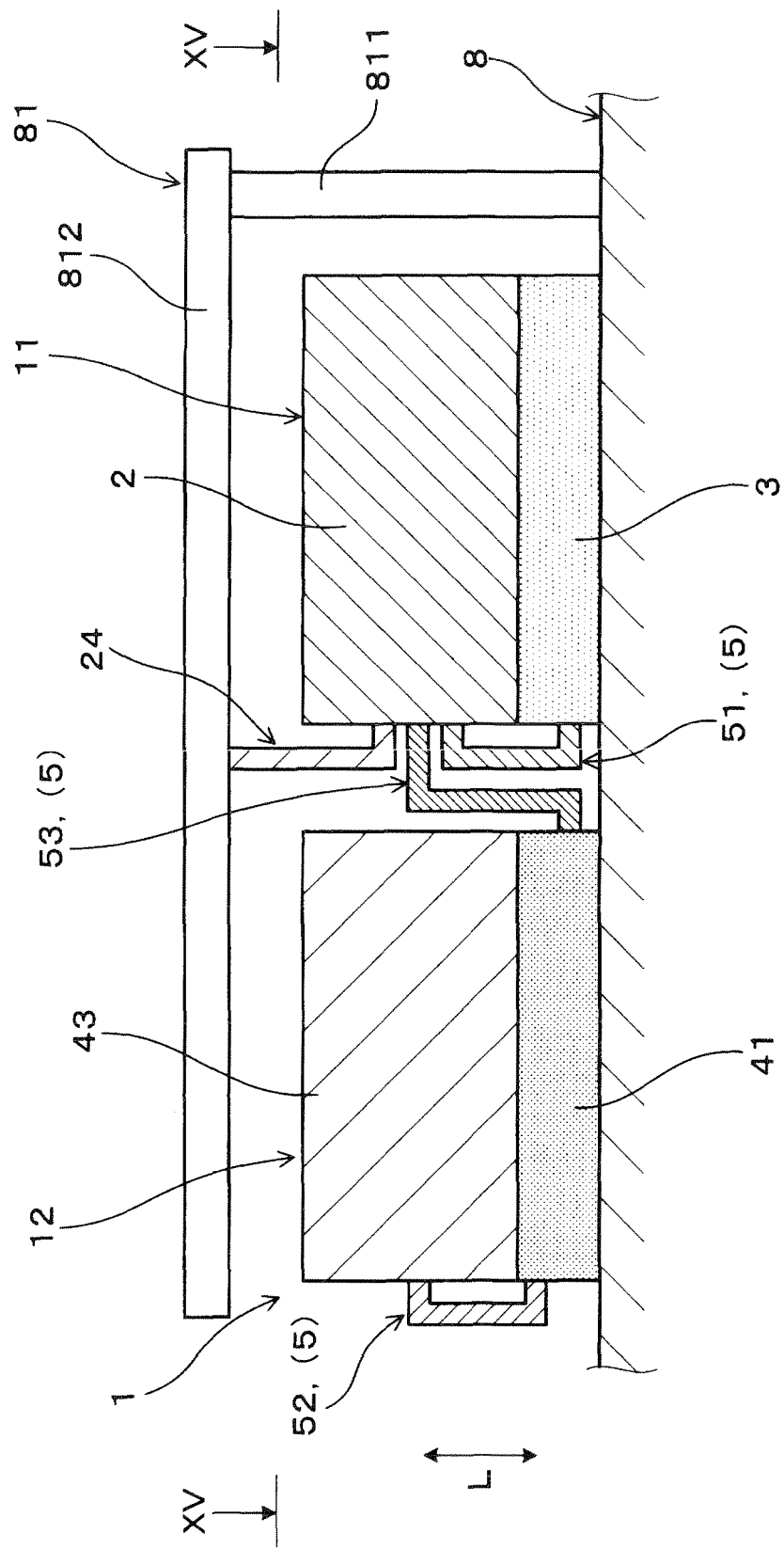
FIG. 14 is a sectional view which illustrates a power-supply apparatus according to the sixth embodiment.
Figure 15:
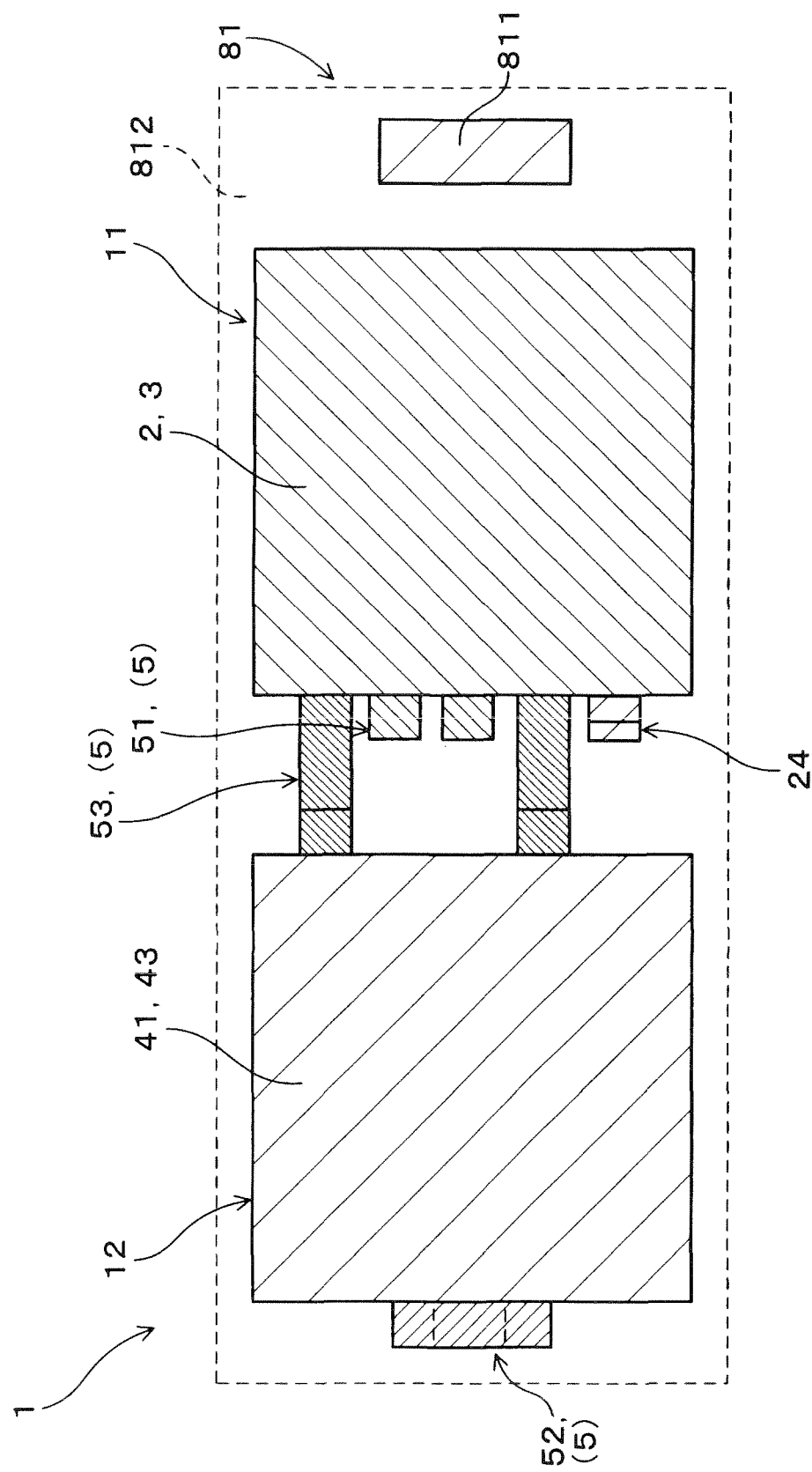
FIG. 15 is a plane view of the power-supply apparatus, as viewed from an arrow XV in FIG. 14.

FIGS. 14 and 15 illustrate the power-supply apparatus 1 according to the sixth embodiment which is partially different in structure from the first embodiment. The same reference numbers as employed in the first embodiment will refer to the same parts, and explanation thereof in detail will be omitted here.

The power-supply apparatus 1 is equipped with a conductive member 81 and a grounding conductor 24. The conductive member 81 is joined to the base plate 8. The grounding conductor 24 connects between the conductive member 81 and the transformer 2. The base plate 8 is connected to ground, so that the electric potential thereat is 0V.

The conductive member 81 is made of conductive material and includes a supporting post 811 and a conductive plate 812. The supporting post 811 extends straight from the base plate 8 in the stacking direction L. The conductive plate 812 is borne by an upper end of the supporting post 811 and extends horizontally over the upper surfaces of the first stack 11 and the second stack 12. The supporting post 811 and the conductive plate 812 are each made of electrically conductive material.

The grounding conductor 24 is made of electrically conductive material. The grounding conductor 24 extends horizontally from the side surface of the transformer 2 of the second stack 12 toward the first stack 11 and is bent upward. The grounding conductor 24 connects at an upper end thereof with the conductive plate 812. Specifically, the grounding conductor 24 is electrically connected to ground through the conductive member 81.

The other arrangements are identical with those in the first embodiment, and explanation thereof in detail will be omitted here.

The conductive plate 812 serves as a noise shield to block the electromagnetic noise generated in the power-supply apparatus 1. The conductive member 81 may be provided by a discrete one of component parts of the power-supply apparatus 1 or a portion of a casing in which the power-supply apparatus 1 is installed. The latter case results in a decrease in parts of the power-supply apparatus 1 and a simplified structure thereof.

The structure of the power-supply apparatus 1 of this embodiment offers substantially the same beneficial advantages as those in the first embodiment.

Figure 16:
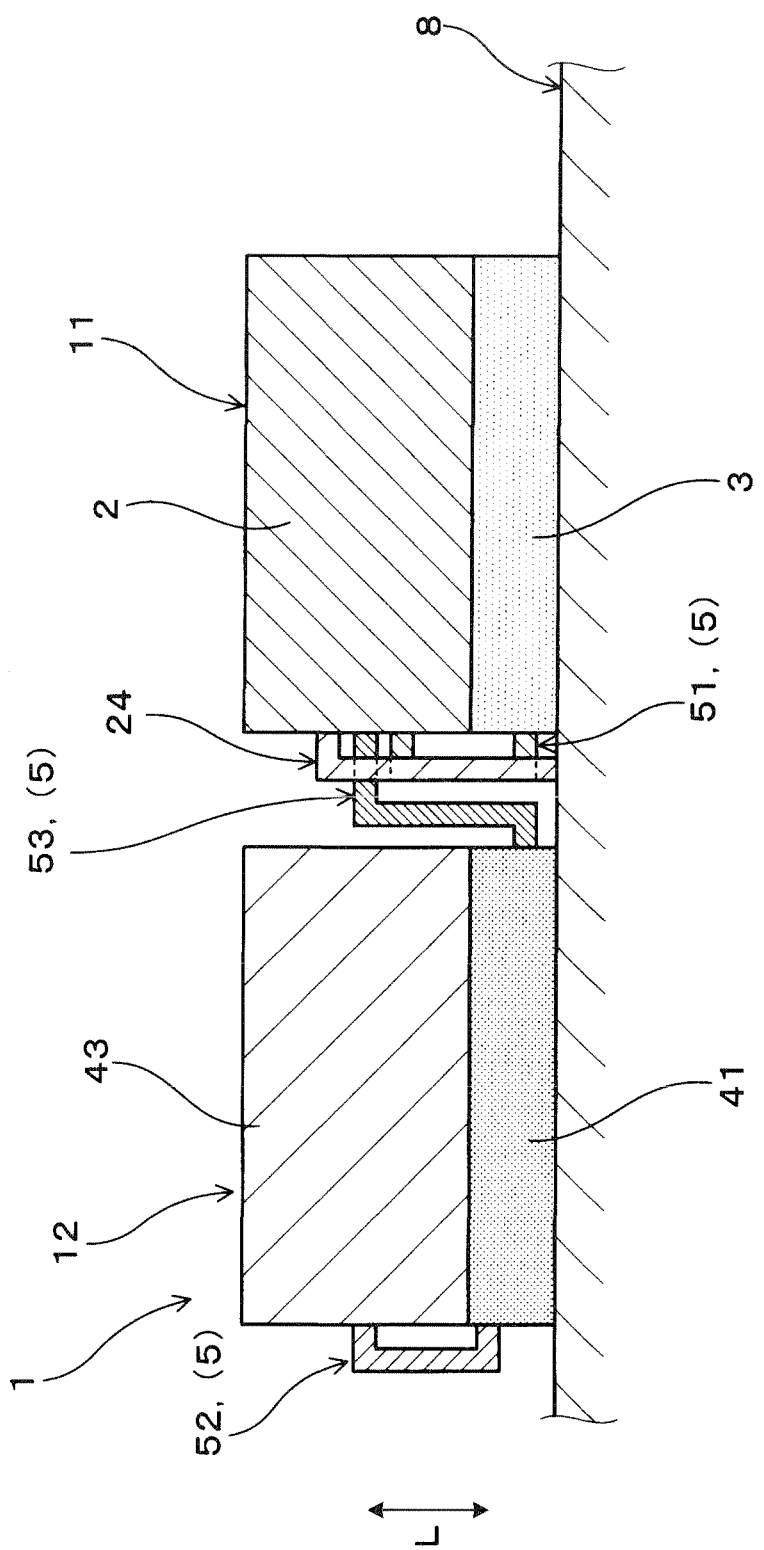
FIG. 16 is a sectional view which illustrates a modification of the power-supply apparatus of FIG. 15.

The grounding conductor 24 of the transformer 2 is connected to the base plate 8 through the conductive member 81, but may alternatively be, as illustrated in FIG. 16, joined directly to the base plate 8.

The conductive plate 812 may be either entirely or partially made of conductive material. For instance, the conductive plate 812 may be formed by a circuit board such as a thick copper substrate made by an electrically insulating substrate and thick copper foil formed on the surface of the electrically insulating substrate.

Figure 17:
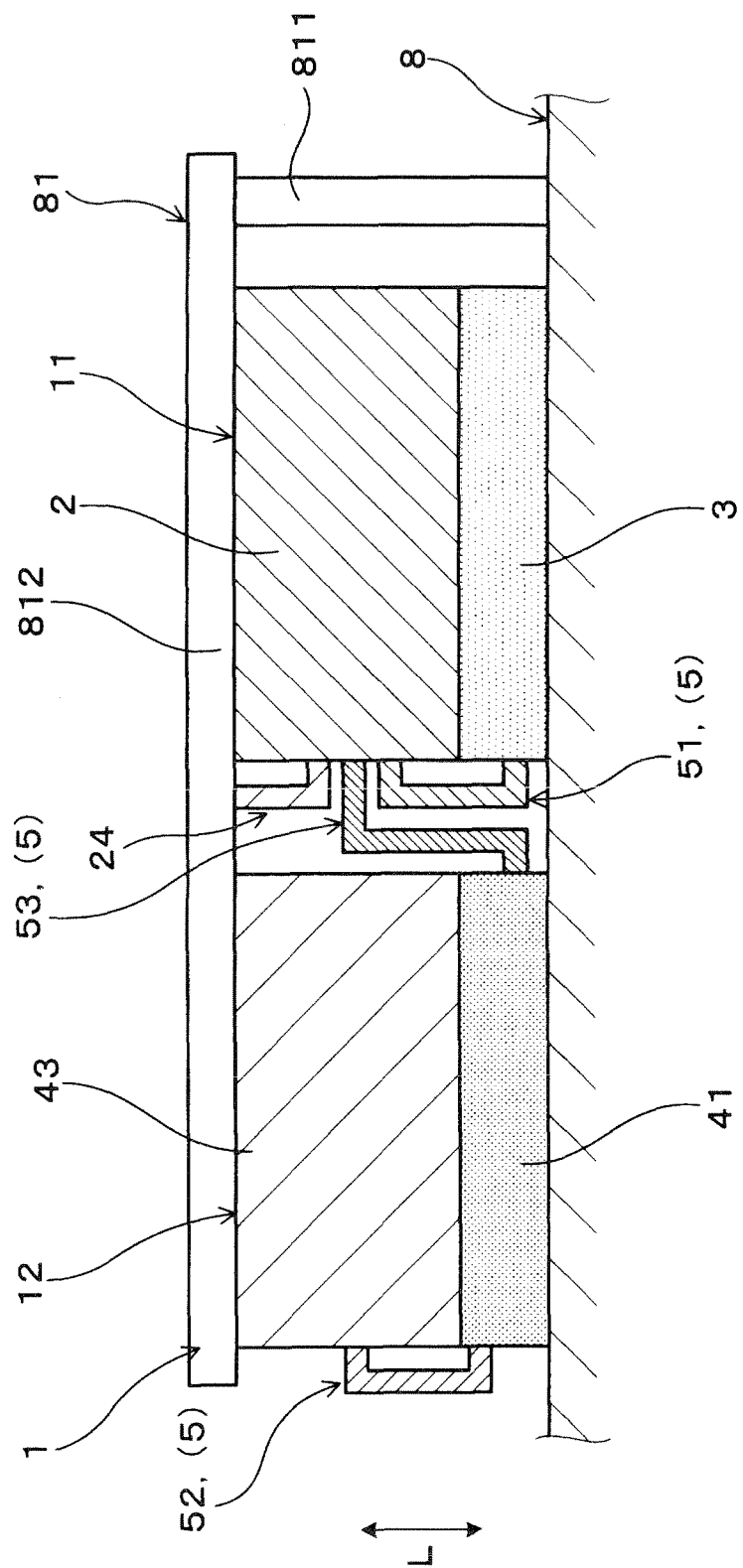
FIG. 17 is a sectional view which illustrates a power-supply apparatus according to the seventh embodiment.

FIG. 17 illustrates the power-supply apparatus 1 according to the seventh embodiment which is a modification of the sixth embodiment of FIGS. 14 to 16. The same reference numbers as employed in the sixth embodiment will refer to the same parts, and explanation thereof in detail will be omitted here.

The conductive member 81 has the conductive plate 812 placed in direct contact with the upper surfaces of the first stack 11 and the second stack 12. Other arrangements are identical with those in the sixth embodiment.

Specifically, the conductive plate 812 works as a heat radiator to absorb heat, as developed in the first stack 11 and the second stack 12. The conductive plate 812 also dissipates the absorbed heat and thus serves as a cooler to cool the first stack 11 and the second stack 12 to keep them at a desired temperature.

The structure of the power-supply apparatus 1 of this embodiment offers substantially the same beneficial advantages as those in the first embodiment.

It is advisable that the conductive plate 812 be made of material which is a highly electrically conductive and/or highly thermally conductive material.

The power-supply apparatus 1 may also have highly thermally conductive members disposed between the conductive plate 812 and the first stack 11 and between the conductive plate 812 and the second stack 12.

Figure 18:
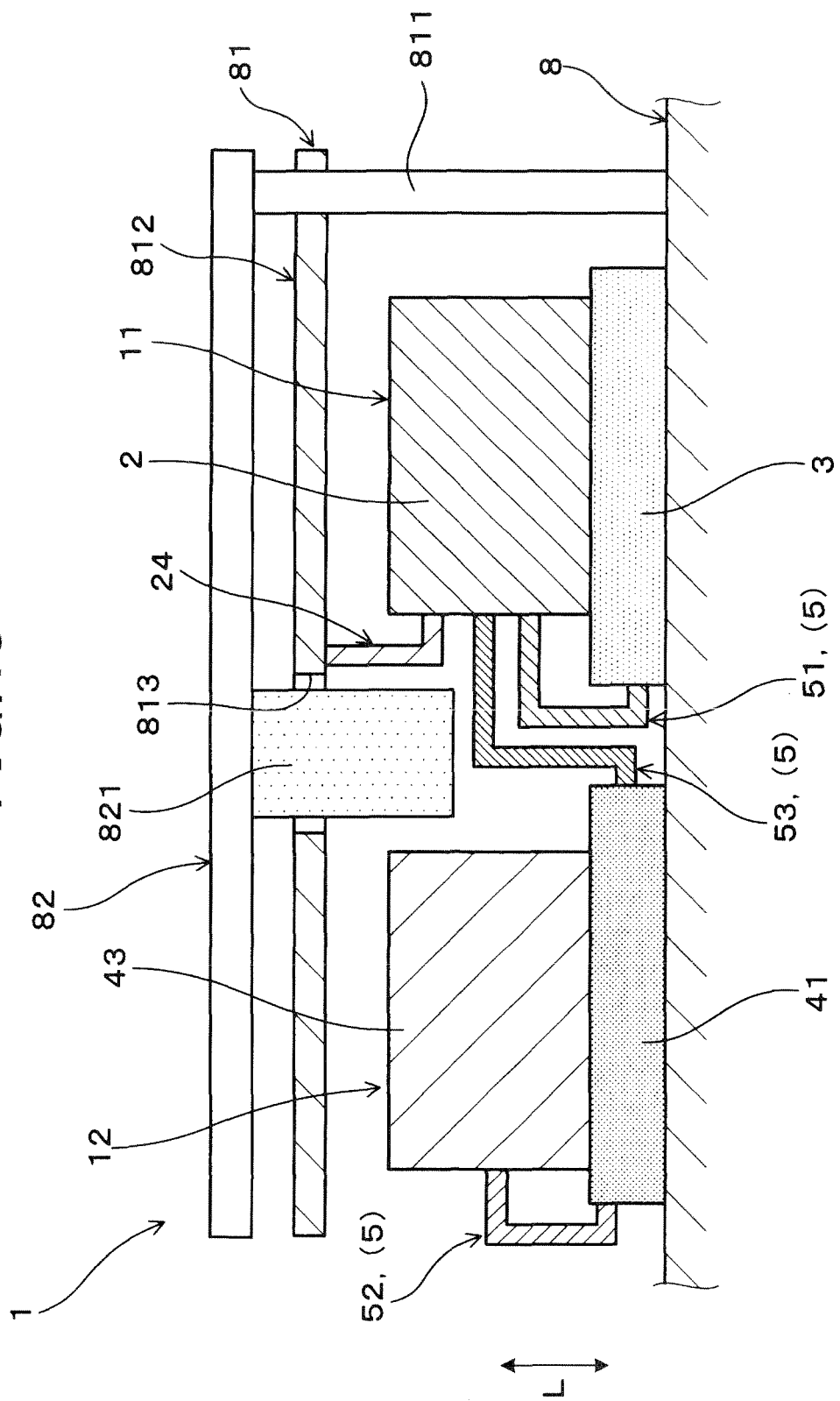
FIG. 18 is a sectional view which illustrates a power-supply apparatus according to the eighth embodiment.

FIG. 18 illustrates the power-supply apparatus 1 according to the eighth embodiment which is a modification of the sixth embodiment of FIGS. 14 to 16. The same reference numbers as employed in the sixth embodiment will refer to the same parts, and explanation thereof in detail will be omitted here.

The power-supply apparatus 1 is equipped with a control circuit board 82 disposed above the conductive plate 812 of the conductive member 81. The control circuit board 82 works as a control circuit to control on-off operations of the switching devices 31 of the primary semiconductor module 3. The control circuit board 82 has mounted on a lower surface thereof an electronic part 821 making up the control circuit. The electronic part 821 is, for example, a capacitor. The conductive plate 812 has formed therein a hole 813 through which the electronic part 821 is disposed.

The transformer 2 is configured to have an outer shape smaller than that of the primary semiconductor module 3, as viewed from above the first stack 11. The choke coil 43 is configured to have an outer shape smaller than that of the secondary semiconductor module 41, as viewed from above the second stack 12. Consequently, the distance (i.e., the shortest interval) between the transformer 2 and the choke coil 43 is longer than that between the primary semiconductor module 3 and the secondary semiconductor module 41 in the horizontal direction, as viewed in FIG. 18 (i.e., the planar direction of the base plate 8). This creates a space or chamber whose size is great enough to arrange the electronic part 821 of the control circuit board 82 between the transformer 2 and the choke coil 43 when the first stack 11 and the second stack 12 are disposed in place on the base plate 8.

The other arrangements are identical with those in the first embodiment, and explanation thereof in detail will be omitted here.

The electronic part 821 is, as described above, disposed between the first stack 11 and the second stack 12 to utilize the space within the power-supply apparatus 1 effectively. This permits the power-supply apparatus 1 to be reduced in size thereof.

The structure of the power-supply apparatus 1 of this embodiment offers substantially the same beneficial advantages as those in the first embodiment.

Figure 19:
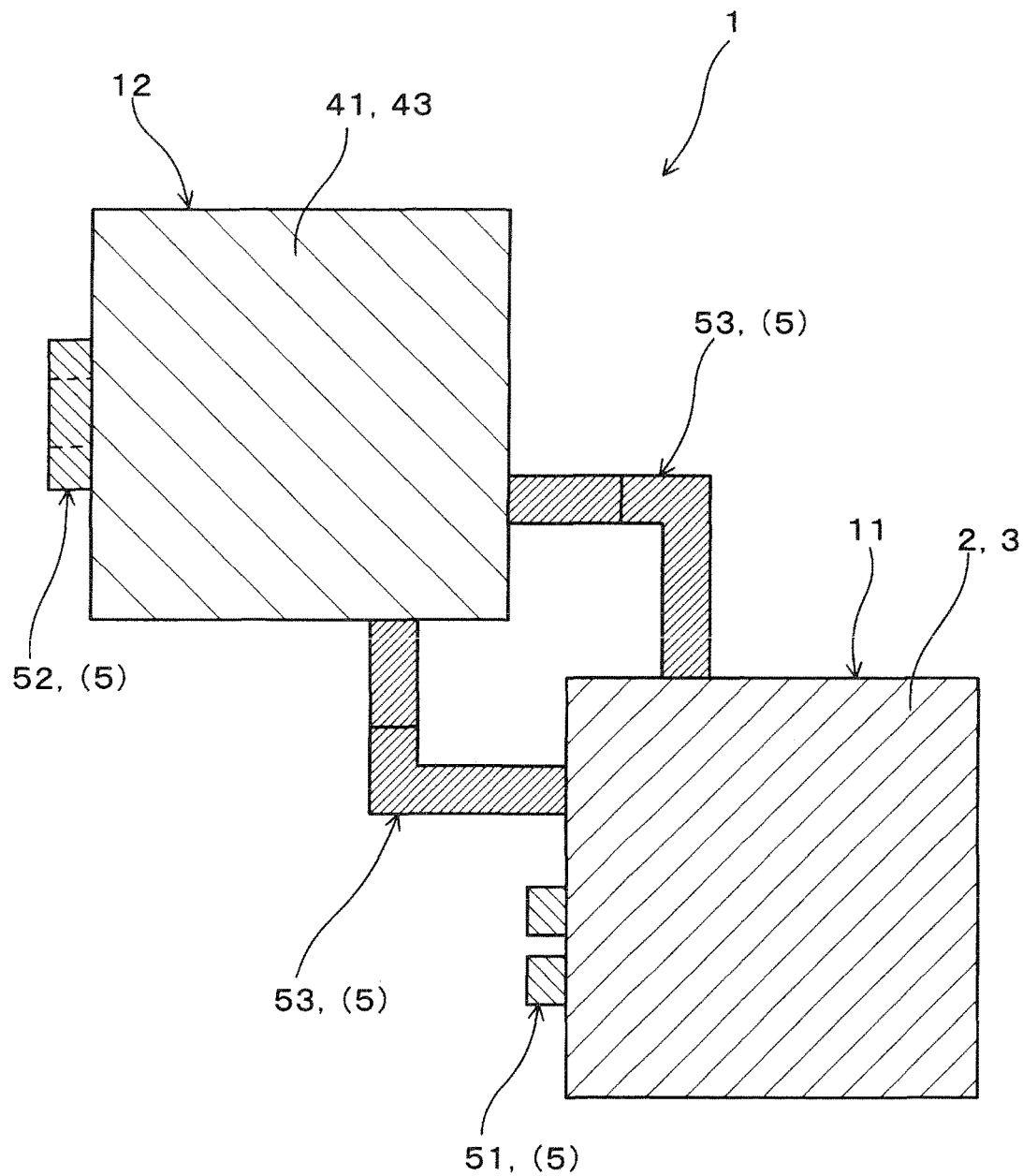
FIG. 19 is a plane view which illustrates a power-supply apparatus according to the ninth embodiment.

FIG. 19 illustrates the power-supply apparatus 1 according to the ninth embodiment which is a modification of the one in the sixth embodiment of FIGS. 14 to 16. The same reference numbers as employed in the sixth embodiment will refer to the same parts, and explanation thereof in detail will be omitted here.

As viewed from above the power-supply apparatus 1, the first stack 11 and the second stack 12 are arranged in misalignment with each other in a direction (i.e., a vertical direction in FIG. 19) perpendicular to a direction (i.e., a horizontal direction in FIG. 19) in which the secondary connecting conductor 52 protrudes from the side surface of the second stack 12. In other words, the first stack 11 is offset from the second stack 12 in the direction in which the secondary connecting conductor 52 protrudes from the side surface of the second stack 12. Each of the intermediate connecting conductors 53 is of a substantially L-shape, as viewed from above the power-supply apparatus 1.

The other arrangements are identical with those in the first embodiment, and explanation thereof in detail will be omitted here.

As apparent from the above discussion, the power-supply apparatus 1 of the ninth embodiment is designed to have the first stack 11 and the second stack 12 oriented in misalignment with each other in the direction perpendicular to any of the side surfaces of the first and second stacks 11 and 12. The degree of the misalignment may be altered depending upon the size or configuration of space in which the power-supply apparatus 1 is required to be installed.

The structure of the power-supply apparatus 1 of this embodiment offers substantially the same beneficial advantages as those in the first embodiment.

In the first to ninth embodiments, each of the primary semiconductor module 3 and the secondary semiconductor module 41 may be made of a plurality of semiconductors which are different in function from each other or identical in function with each other or alternatively be engineered to include discrete semiconductors.

The power-supply apparatus 1 may be designed to have at least one of the connecting conductors 5 disposed between the first stack 11 and the second stack 12. This even decreases the overall length of the connecting conductors 5, thus resulting in a decrease in loop area of the connecting conductors 5.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The parts of the power-supply apparatus 1 in each of the first to ninth embodiments may be replaced with other known parts which are substantially identical in function.

What is claimed is:
1. A power-supply apparatus comprising:
a transformer equipped with a primary coil and a secondary coil;
a primary semiconductor unit in which semiconductor devices are installed, the primary semiconductor unit being joined to the primary coil of the transformer;
a secondary semiconductor unit in which semiconductor devices are installed, the secondary semiconductor unit being joined to the secondary coil of the transformer;
a secondary electronic device which makes up a secondary circuit along with the secondary semiconductor unit;
a plurality of connecting conductors which electrically connect among the transformer, the primary semiconductor unit, the secondary semiconductor unit, and the secondary electronic device;

a first stack made up of one of the transformer and the secondary electronic device and made up of the primary semiconductor unit; and a second stack made up of the other of the transformer and the secondary electronic device and made up of the secondary semiconductor unit;

wherein the first stack and the second stack are configured to shield electromagnetic noise emitted from at least one of the primary semiconductor unit or the secondary semiconductor unit.

2. A power-supply apparatus as set forth in claim 1, wherein at least one of the connecting conductors is disposed between the first stack and the second stack.

3. A power-supply apparatus as set forth in claim 1, wherein the first stack is formed by the primary semiconductor unit and the transformer overlapping each other, and wherein a primary connecting conductor that is one of said connecting conductors connects between the primary semiconductor unit and the transformer and is arranged between the first stack and the second stack.

4. A power-supply apparatus as set forth in claim 1, wherein the second stack is formed by the secondary semiconductor unit and the secondary electronic device overlapping each other, the secondary semiconductor unit constituting a rectifier circuit, wherein the secondary electronic device is a choke coil, and wherein a secondary connecting conductor that is one of said connecting conductors connects between the secondary semiconductor unit and the secondary electronic device and is arranged on a surface of the second stack which is farther away from the first stack.

5. A power-supply apparatus as set forth in claim 1, wherein the connecting conductors are all disposed between the first stack and the second stack.

* * * * *